United States Patent
Zhang et al.

(10) Patent No.: US 12,293,539 B2
(45) Date of Patent: May 6, 2025

(54) LOCATION IDENTIFICATION WITH MULTIPLE IMAGES

(71) Applicant: Hewlett-Packard Development Company, L.P., Spring, TX (US)

(72) Inventors: Peter Siyuan Zhang, Spring, TX (US); Yun David Tang, Spring, TX (US); Guoxing Yang, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 27 days.

(21) Appl. No.: 18/547,633

(22) PCT Filed: Mar. 8, 2021

(86) PCT No.: PCT/US2021/021348
§ 371 (c)(1),
(2) Date: Aug. 23, 2023

(87) PCT Pub. No.: WO2022/191816
PCT Pub. Date: Sep. 15, 2022

(65) Prior Publication Data
US 2024/0070898 A1   Feb. 29, 2024

(51) Int. Cl.
*H04N 5/232*   (2006.01)
*G06T 7/70*   (2017.01)
*G06V 10/77*   (2022.01)
*G06V 10/776*   (2022.01)
*G06V 10/82*   (2022.01)
(Continued)

(52) U.S. Cl.
CPC ............ *G06T 7/70* (2017.01); *G06V 10/7715* (2022.01); *G06V 10/776* (2022.01); *G06V 10/82* (2022.01); *H04N 5/2624* (2013.01); *H04N 5/2628* (2013.01); *H04N 23/80* (2023.01);
(Continued)

(58) Field of Classification Search
CPC ............ G06T 7/70; G06T 2207/20084; G06T 2207/20212; G06T 2207/30244; G06V 10/7715; G06V 10/776; G06V 10/82; G06V 10/22; H04N 5/2624; H04N 5/2628; H04N 23/80; H04N 23/698
See application file for complete search history.

(56) References Cited

U.S. PATENT DOCUMENTS 9,508,151 B2   11/2016   Romanik et al.
10,572,757 B2   2/2020   Graham et al.
(Continued)

FOREIGN PATENT DOCUMENTS

EP   0435522 A2   7/1991

*Primary Examiner* — Howard D Brown, Jr.
(74) *Attorney, Agent, or Firm* — Knobbe, Martens, Olson & Bear, LLP (57) ABSTRACT

Examples of electronic devices are described herein. In some examples, an electronic device includes a camera to capture a composite image comprising multiple images of a location. In some examples, the electronic device includes a processor to crop a portion of the composite image based on a field-of-view of the camera. In some examples, the processor is to determine whether a neural network identifies the cropped portion. In some examples, the processor is to generate a unique identifier (ID) for the cropped portion in response to the cropped portion being unidentified by the neural network. In some examples, the processor is to associate the unique ID of the cropped portion with the location.

15 Claims, 8 Drawing Sheets

(51) Int. Cl.
    *H04N 5/262*     (2006.01)
    *H04N 23/80*     (2023.01)
    *H04N 23/698*    (2023.01)

(52) U.S. Cl.
    CPC ............... *G06T 2207/20084* (2013.01); *G06T 2207/20212* (2013.01); *H04N 23/698* (2023.01)

(56) References Cited

U.S. PATENT DOCUMENTS

| | | |
|---|---|---|
| 10,832,437 B2 | 11/2020 | Stenger et al. |
| 2017/0109615 A1 | 4/2017 | Yatziv et al. |
| 2017/0262736 A1 | 9/2017 | Yu et al. |
| 2018/0060655 A1 | 3/2018 | Anastassov et al. |
| 2018/0157913 A1 | 6/2018 | Masters et al. |
| 2019/0222754 A1* | 7/2019 | Shibagami ............ H04N 23/611 |
| 2019/0311221 A1 | 10/2019 | Nariyambut Murali et al. |
| 2019/0373170 A1 | 12/2019 | Fujita |
| 2021/0056292 A1* | 2/2021 | Mao ..................... G06N 3/045 |

* cited by examiner

ID List 822

| ID 826 | Feature Embedding 828 | Registered Location 824 |
|---|---|---|
| 1 | 1 4 5 43 59 ... 49 56 | Office |
| 2 | 2 3 4 77 44 ... 98 77 | Office |
| 3 | 43 12 10 2 3 ... 60 81 | Bedroom |
| 4 | 47 15 16 44 ... 50 62 | Bedroom |
| 5 | 1 8 9 68 ... 52 70 | Office |

FIG. 8

LOCATION IDENTIFICATION WITH MULTIPLE IMAGES

BACKGROUND

Electronic technology has advanced to become virtually ubiquitous in society and has been used to improve many activities in society. For example, electronic devices are used to perform a variety of tasks, including work activities, communication, research, and entertainment. Different varieties of electronic circuits may be utilized to provide different varieties of electronic technology.

BRIEF DESCRIPTION OF THE DRAWINGS

Various examples will be described below by referring to the following figures.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples in accordance with the description; however, the description is not limited to the examples provided in the drawings.

DETAILED DESCRIPTION

An electronic device may be a device that includes electronic circuitry. For instance, an electronic device may include integrated circuitry (e.g., transistors, digital logic, semiconductor technology, etc.). Examples of electronic devices include computing devices, laptop computers, desktop computers, smartphones, tablet devices, wireless communication devices, game consoles, game controllers, smart appliances, printing devices, vehicles with electronic components, aircraft, drones, robots, smart appliances, etc.

In some examples, the electronic device may perform an operation based on a detected location of the electronic device. For example, the electronic device may perform a first operation in a first location and the electronic device may perform a second operation in a second location. In some examples, the different operations may include applying security settings (e.g., security screens) based on the detected location. In some examples, the electronic device may change performance settings (e.g., power usage, CPU speed, display brightness, speaker levels, etc.) based on the detected location of the electronic device.

In some examples, the electronic device may detect the location based on captured images. For example, the electronic device may include a camera to capture images. The electronic device may differentiate between locations based on the captured images.

In an example, a user may use the camera on their laptop computer to capture an image of a location (e.g., home office, coffee shop, work office, etc.). Features from the image may be used to determine if a current location is recognized by the electronic device. For example, one way to extract a single feature from an image is to take an average of the red-green-blue (RBG) color values in the image to compare with a list of images from a known location to see if any of the average RGB values match. This approach may be referred to as picture matching.

Another example of extracting features from an image is through key point detection. In this approach, the type of key point in the image may be an edge point, a corner point, etc. The feature point may be of a unique texture and/or pattern, which is invariant to rotation, translation and scaling. Extracting these points may include calculating an image gradient (e.g., using Laplacian of Gaussian Filter). Non-maximum suppression and filtering may be used for removing spurious points and weak feature points.

In some examples, machine learning may be used to detect the location in an image. For example, a neural network may be used to convert an image to a list of feature embeddings. The neural network may then measure the difference in images of known locations to determine if the current image is taken from a known location.

In the example of the neural network-based location detection, a one-shot learning object categorization may be used. For example, one image captured by a camera may be associated with one unique identifier (ID). However, the camera of an electronic device may not have a field-of-view that can see the entire location in a single image (e.g., a one-shot image). This may make using the camera for one-shot learning of the location difficult.

Although a neural network may have tolerance for variability in images and may allow a slightly different image, a neural network may be unable to identify a location if the view of an image captured by the camera differs from the images used to train the neural network to identify a location. In that case, a user may take multiple images of a location to generate multiple IDs for the single location. Examples are described herein to streamline location identification by a neural network using multiple images of a location.

Figure 1:
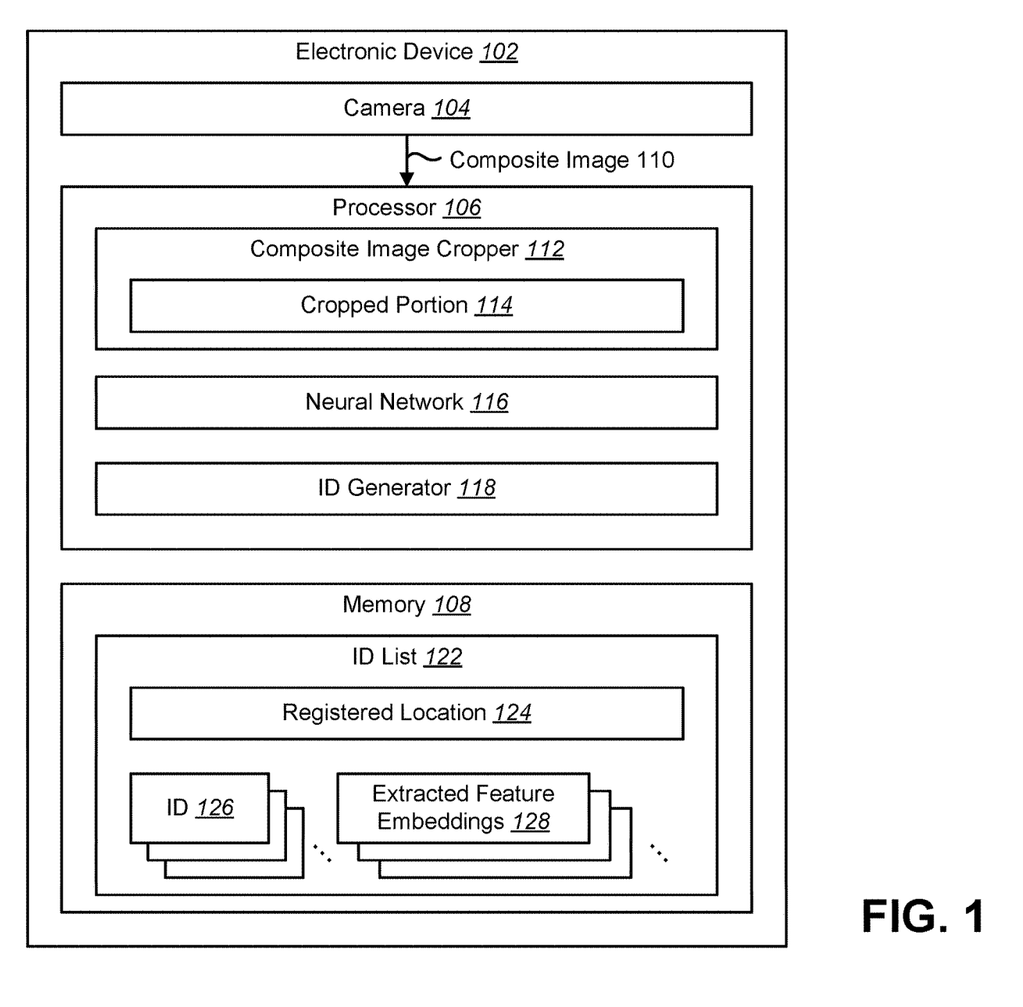
FIG. 1 is a block diagram illustrating an example of an electronic device to perform location identification with a composite image.

FIG. 1 is a block diagram illustrating an example of an electronic device 102 to perform location identification with a composite image 110. Examples of the electronic device 102 may include computing devices, laptop computers, desktop computers, tablet devices, cellular phones, smartphones, wireless communication devices, gaming consoles, gaming controllers, smart appliances, printing devices, automated teller machines (ATMs), vehicles (e.g., automobiles) with electronic components, autonomous vehicles, aircraft, drones, robots, smart appliances, etc.

In some examples, the electronic device 102 may include a processor 106. The processor 106 may be any of a microcontroller (e.g., embedded controller), a central processing unit (CPU), a semiconductor-based microprocessor, graphics processing unit (GPU), field-programmable gate array (FPGA), an application-specific integrated circuit (ASIC), a circuit, a chipset, and/or other hardware device suitable for retrieval and execution of instructions stored in a memory 108. The processor 106 may fetch, decode, and/or execute instructions stored in memory 108. While a single processor 106 is shown in FIG. 1, in other examples, the processor 106 may include multiple processors (e.g., a CPU and a GPU).

The memory 108 of the electronic device 102 may be any electronic, magnetic, optical, and/or other physical storage device that contains or stores electronic information (e.g., instructions and/or data). The memory 108 may be, for example, Random Access Memory (RAM), Electrically Erasable Programmable Read-Only Memory (EEPROM), Dynamic Random Access Memory (DRAM), Synchronous DRAM (SDRAM), magnetoresistive random-access memory (MRAM), phase change RAM (PCRAM), non-volatile random-access memory (NVRAM), memristor, flash memory, a storage device, and/or an optical disc, etc. In some examples, the memory 108 may be a non-transitory tangible computer-readable storage medium, where the term "non-transitory" does not encompass transitory propagating signals. The processor 106 may be in electronic communication with the memory 108. In some examples, a processor 106 and/or memory 108 of the electronic device 102 may be combined with or separate from a processor (e.g., CPU) and/or memory of a host device.

In some examples, the electronic device 102 may include a camera 104. In some examples, the camera 104 may be integrated with the electronic device 102. For example, in the case of a laptop computer, a tablet computer, or a smartphone, the camera 104 may be built into the electronic device 102. In other examples, the camera 104 may be separate from the electronic device 102 but may communicate with the electronic device 102. For example, an external webcam may be connected to the electronic device 102.

The camera 104 may capture images. In some examples, the images may be generated from light in a spectrum visible to humans. In some examples, the images may be generated from non-visible wavelengths (e.g., infrared, ultraviolet, x-ray, microwave, etc.). In some examples, the camera 104 may capture images based on magnetic fields.

In some examples, the camera 104 may capture video images and/or a sequence of still images. The images captured by the camera 104 may be two-dimensional images. For example, the images may be defined by an x-coordinate and a y-coordinate.

In some examples, the camera 104 may capture a composite image 110. As used herein, a composite image 110 is a single image generated from multiple images. In some examples, the camera 104 may capture multiple images that are combined to form the composite image 110. It should be noted that in some examples, the camera 104 outputs the composite image 110. In some examples, the camera 104 may provide multiple images to the processor 106, which then combines the images to generate the composite image 110.

In some examples, the composite image 110 may be a panorama image of the location. For example, the camera 104 may capture multiple images as the camera 104 is moved to observe different views of the location. In some examples, the movement of the camera 104 may be a pan movement (e.g., swivel) in which the view of the camera 104 changes, but the camera 104 remains approximately in a fixed position. In some examples, the camera 104 may swivel in a horizontal plane and/or a vertical plane. In other examples, the camera 104 may be physically moved to different locations while capturing images. The multiple captured images may be combined to form a panorama image of the location.

In some examples, the camera 104 may capture the composite image 110 in a single scanning operation. As used herein, a scanning operation includes the camera 104 actively capturing images that are to be combined to form the composite image 110. During the scanning operation, the camera 104 may capture multiple images as the camera 104 is moved to view different parts of the location. In some examples, the camera 104 may capture views of the location that are unobservable for the camera 104 if the camera 104 remained in a fixed position. At the end of the scanning operation, the captured images (or a subset of the captured images) may be combined to form the composite image 110.

In an example of a scanning operation, a user may initiate and/or may be instructed (e.g., by the electronic device 102) to move the camera 104 to face different parts of the location. While the user changes the orientation of the camera 104 and/or moves the camera 104 to different locations, the camera 104 may capture images.

The camera 104 may stop capturing images at the end of the scanning operation. For example, the camera 104 may stop capturing images after a period of time. In another example, the camera 104 may stop capturing images after a number of images are captured. In yet another example, the camera 104 may stop capturing images in response to a command (e.g., from the user).

In some examples, the composite image 110 may be of a location without a user in the image 110. For example, a user may position themselves such that the camera 104 does not view the user.

In some examples, the images used to generate the composite image 110 may include the user. In this case, the camera 104 or the processor 106 may mask out the user when generating the composite image 110 such that the user is not present in the composite image 110. In one example, a masked region (e.g., a trapezoid or a rectangle region) may be used. A user may be instructed to move and place their face within the masked region in the image. The masked region may be assigned a uniform grayscale value, e.g., 110. In another example, a dynamic face detection approach may be used for masking a user. Face region extraction may guide the processor 106 to exclude a human face and body region in the composite image 110. These examples may capture features for one-shot learning while allowing a user to observe the images being captured by the camera 104.

In some examples, the processor 106 may implement a composite image cropper 112. In some examples, upon receiving the composite image 110, the composite image cropper 112 may crop a portion 114 of the composite image 110 based on a field-of-view of the camera 104. For example, the cropped portion 114 may be determined based on an amount of the composite image 110 viewable by the camera 104 in a fixed position. In other words, the composite image cropper 112 may crop the portion 114 of the composite image 110 equivalent to the image size viewable by an image sensor of the camera 104. In some examples, the cropped portion 114 may be the size of the captured images used to generate the composite image 110. In other examples, the size of the cropped portion 114 may be less than or greater than the size of the images used to generate the composite image 110. An example of a cropped portion 114 of the composite image 110 is described in FIG. 2.

Figure 2:
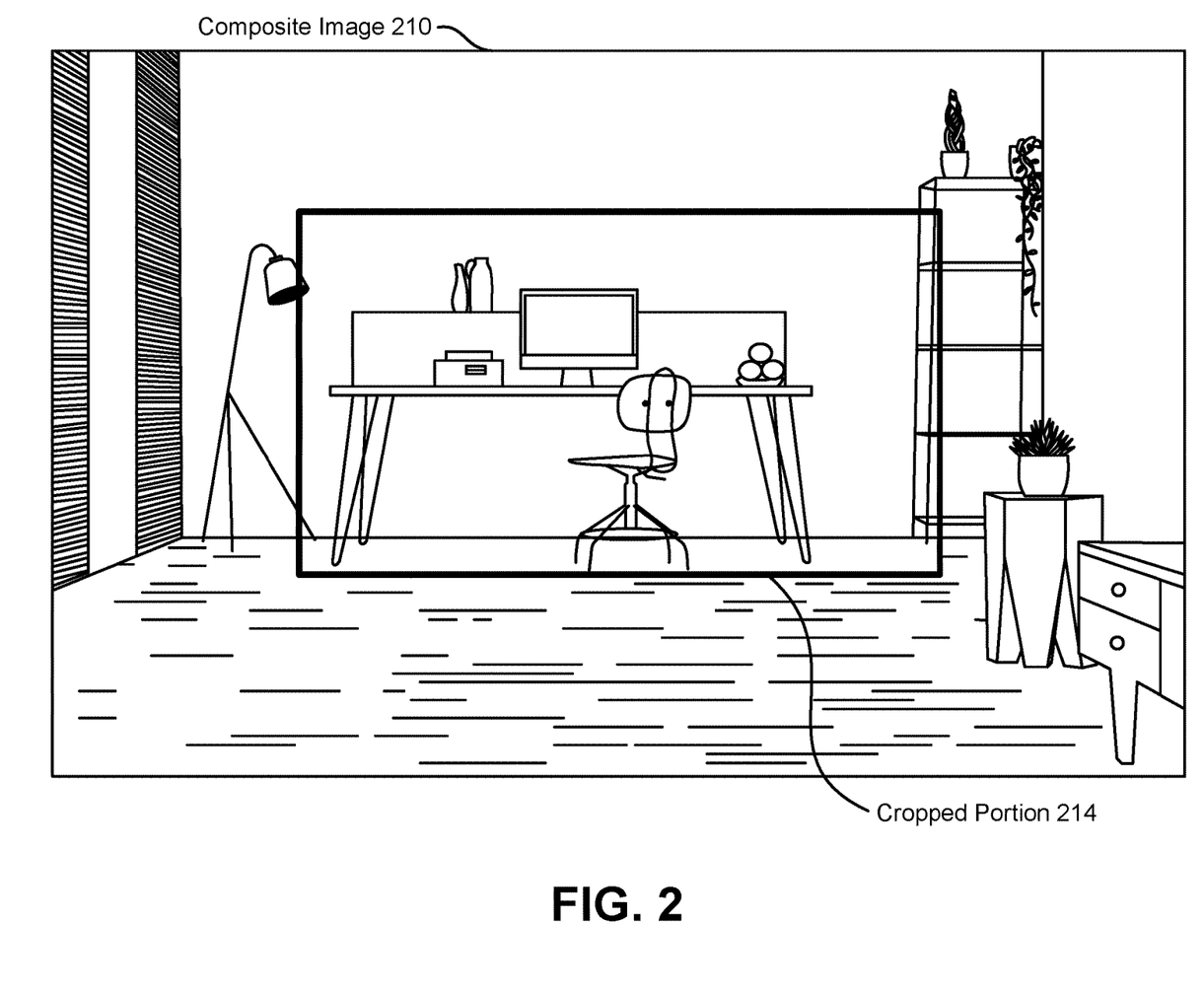
FIG. 2 illustrates an example of a cropped portion of a composite image.

Referring briefly to FIG. 2, the composite image 210 may be of an office. In this case, the composite image 210 may be generated from multiple images. The cropped portion 214 represents the field-of-view of the camera. In this case, the field-of-view of the camera does not cover the entire view of the office as conveyed in the composite image 210.

Referring again to FIG. 1, the electronic device 102 may include circuitry and/or instructions to identify a location using multiple images cropped from the composite image 110. In some examples, the processor 106 may identify the location based on the composite image 110 captured by the camera 104. In some examples, the processor 106 may be embedded in the camera 104. For example, the processor 106 may reside in an image signal processor (ISP) chip of the camera 104. In other examples, the processor 106 may be included in a vision chip that is separate from (e.g., external to) the camera 104. In yet other examples, the processor 106 may run on a host of the electronic device 102 with a GPU.

In some examples, the processor 106 may determine whether a neural network 116 identifies the cropped portion 114. For example, the processor 106 may implement a neural network 116. Some examples of the neural network 116 include convolutional neural networks (CNNs) (e.g., basic CNN, R-CNN, inception model, residual neural network, etc.). The processor 106 may provide the cropped portion 114 to the neural network 116.

The neural network 116 may convert the cropped portion 114 to a list of feature embeddings. As used herein, an embedding is a mapping of a discrete variable to a vector of continuous numbers. A feature embedding may be a lower-dimensional feature vector, where a feature of the image is mapped to a vector. In some examples, a neural network 116 (e.g., a CNN image classifier) may start with an input image. The neural network 116 may apply functions (e.g., filters, an activation function, pooling) to the input image. The neural network 116 may then flatten the results into a feature embedding. The feature embeddings may be fed into a fully connected layer and a voting method may be used to determine the class to which the image belongs. In this case, the neural network 116 may take the feature embeddings and use them as part of one-shot learning.

In some examples, the neural network 116 may be trained to measure distance between images. As used herein, the amount of difference between images as measured by the neural network 116 may be referred to as distance. The neural network 116 may measure distance from the cropped portion 114 to images from known locations to determine if the cropped portion 114 is taken from a registered location. As used herein, a registered location is a location that the neural network 116 has identified based on the feature embeddings in images of the location.

In some examples, the memory 108 may store an ID list 122 for a registered location 124. In some examples, the registered location 124 may be a given location (e.g., an office, a bedroom, a coffee shop, etc.). For a registered location 124, the ID list 122 may store unique IDs 126 for multiple images of the registered location 124. Each unique ID 126 may be associated with extracted feature embeddings 128 from a given image. For example, a first ID 126 may be associated with a first set of extracted feature embeddings 128 from a first image. A second ID 126 may be associated with a second set of extracted feature embeddings 128 from a second image, and so forth.

Upon receiving a cropped portion 114 of the composite image 110, the neural network 116 may convert the cropped portion 114 to feature embeddings. The neural network 116 may then compare the feature embeddings of the cropped portion 114 to the extracted feature embeddings 128 stored in the ID list 122. If the neural network 116 determines that the feature embeddings of the cropped portion 114 are within a threshold distance from extracted feature embeddings 128 stored in the ID list 122, then the neural network 116 may identify the cropped portion 114 with a saved ID 126. By identifying the cropped portion 114 with a saved ID 126, the neural network 116 may determine that the cropped portion 114 depicts a previously saved view of the location. In other words, upon identifying the cropped portion 114 with a saved ID 126, the neural network 116 may determine that the image in the cropped portion 114 is an image of a known location.

If the neural network 116 fails to identify the cropped portion 114, then the cropped portion 114 may be a previously unknown view of the location. In some examples, the neural network 116 may extract feature embeddings 128 from the cropped portion 114 in response to the cropped portion 114 being unidentified by the neural network 116. As used herein, extracting feature embeddings 128 may include generating and saving the feature embeddings 128 of a cropped portion 114.

Figure 8:
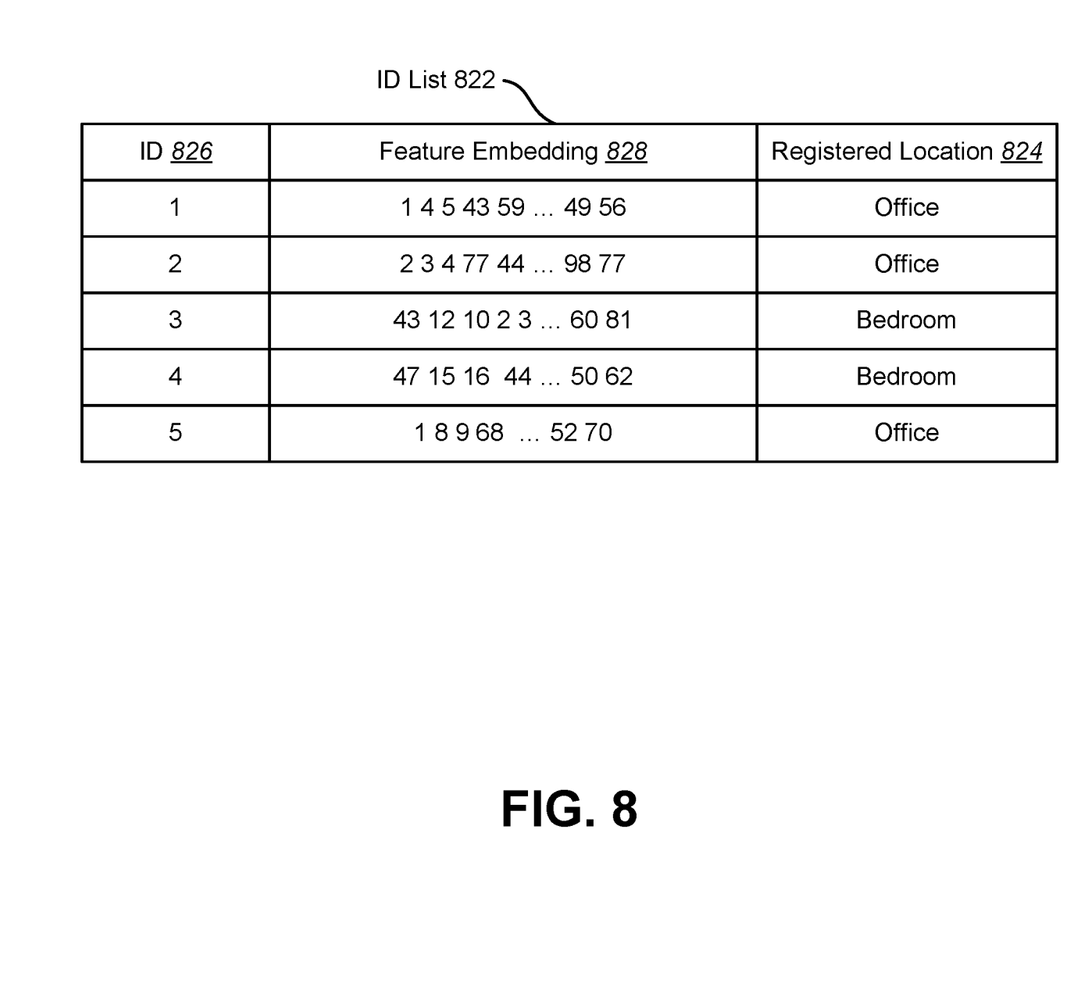
FIG. 8 illustrates an example of an ID list for location identification with a composite image.

In some examples, the processor 106 may implement an ID generator 118. In some examples, the ID generator 118 may generate a unique ID 126 for the cropped portion 114 in response to the cropped portion 114 being unidentified by the neural network 116. The unique ID 126 may differentiate the cropped portion 114 from other images of the location. In some examples, the unique ID 126 may be an index for an ID list 122. An example of an ID list 122 that includes IDs 126, feature embeddings 128, and registered locations 124 is illustrated in FIG. 8.

In some examples, the processor 106 may associate the unique ID 126 of the cropped portion 114 with the location. For example, the processor 106 may save the ID 126 in the ID list 122. The ID 126 may be mapped to the registered location 124. For instance, if the composite image 110 is of an office, the registered location 124 may be that office. In this case, the ID 126 for the cropped portion 114 may be associated with (e.g., mapped to) the office.

In some examples, the ID generator 118 may be aware of used and available IDs 126. For example, the ID generator 118 may check the ID list 122 for a next available ID 126. The ID generator 118 may assign the next available ID 126 to a cropped portion 114 that is unidentified by the neural network 116. The processor 106 may then associate the ID 126 with a registered location 124. The processor 106 may save the ID 126, the extracted feature embedding 128 and the registered location 124 in the ID list 122.

In some examples, the processor 106 may incrementally adjust the position of the cropped portion 114 within the composite image 110 to obtain multiple images with different views of the location. Examples of the adjusted crop position are described in FIG. 3 and FIG. 4.

Figure 3:
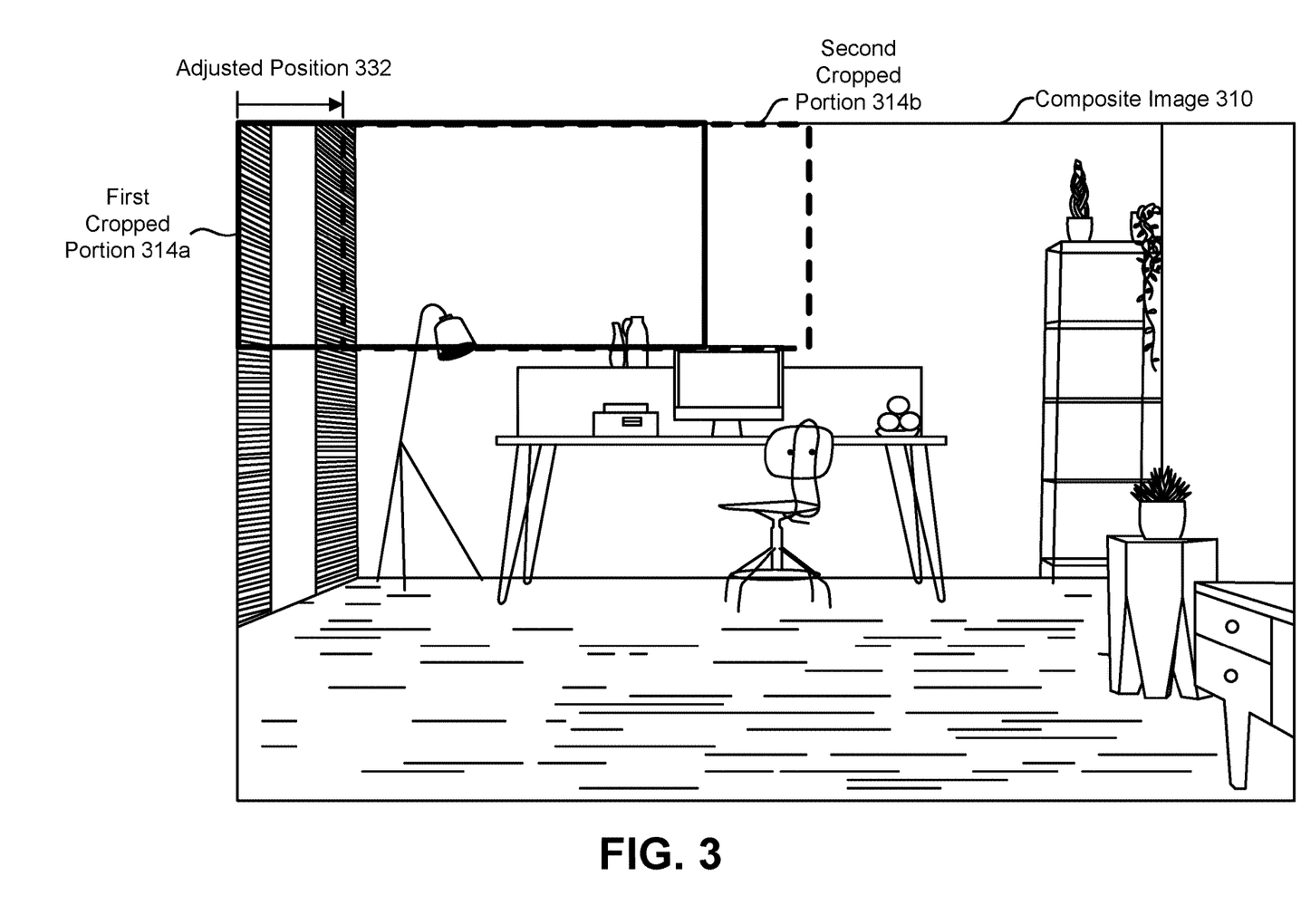
FIG. 3 illustrates an example of adjusting a crop position.

In FIG. 3, the processor may crop a first cropped portion 314a of the composite image 310 at a first position. In this case, the processor starts in the upper left corner of the composite image 310. This first cropped portion 314a may be provided to the neural network for identification.

The processor may then adjust the position for a second cropped portion 314b. In this case, the processor moves to the right to an adjusted position 332. In some examples, the adjusted position 332 may be configured. For example, a larger adjusted position 332 may result in faster processing of the cropped portions, while a smaller adjusted position 332 may increase the accuracy of detecting unique views of the location.

In some examples, the processor may start processing the composite image 310 at other locations (e.g., the bottom right, the upper right, bottom left, etc.). Furthermore, the processor may move the adjusted position 332 in different directions (e.g., up, down, left, right, diagonally, etc.).

Figure 4:
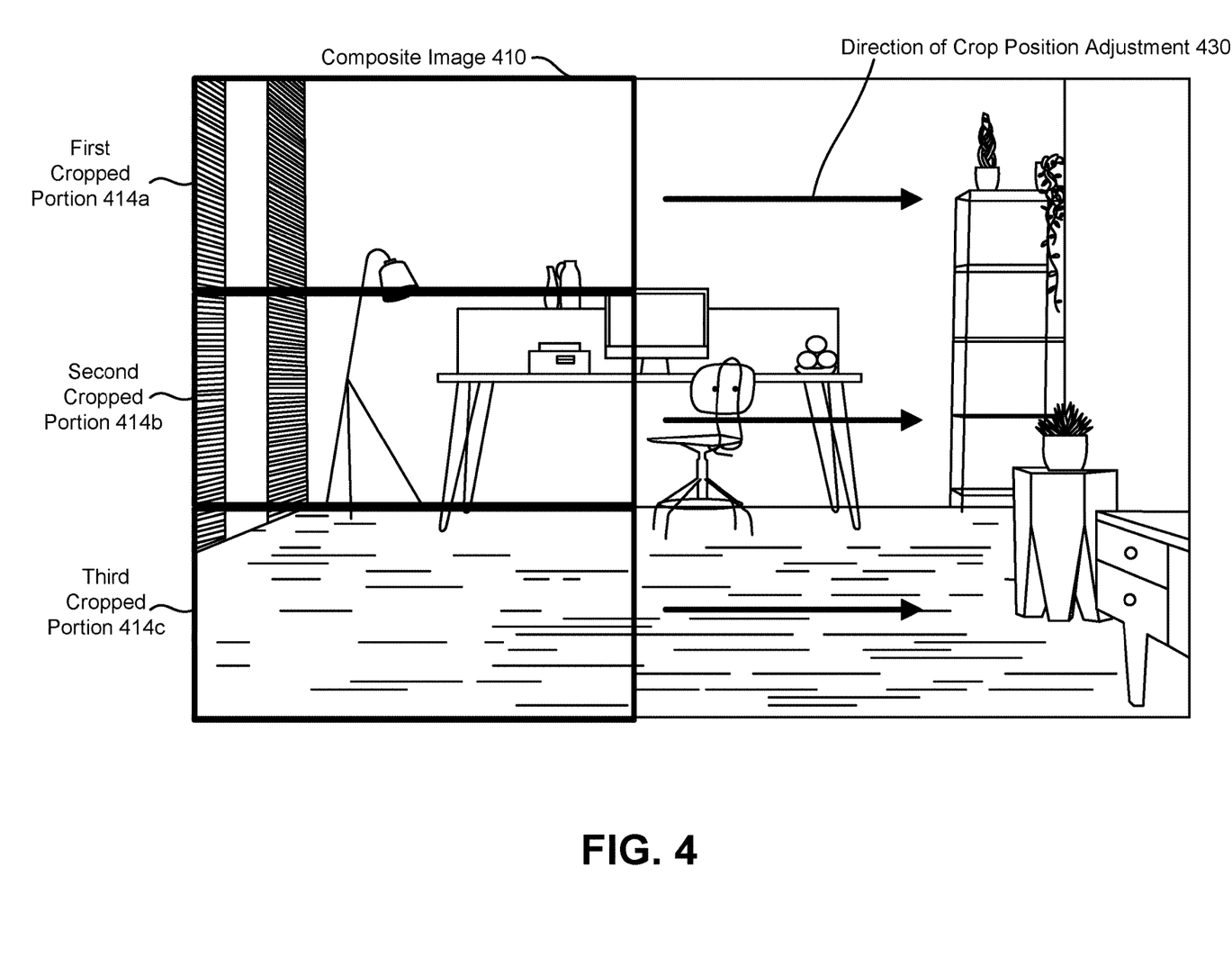
FIG. 4 illustrates another example of adjusting a crop position.

FIG. 4 illustrates another example of adjusted crop positions. In this example, the processor selects a first position for the first cropped portion 414*a* in the upper left corner. The processor may then move in the direction of crop position adjustment 430 for a row of cropped portions. For example, in this case, the processor may adjust the position of the cropped portion from left to right.

Once the processor reaches the end of the row, the processor may restart on the left side and may move the crop position down slightly. In this example, the second cropped portion 414*b* is below the first cropped portion 414*a*. In another example, the second cropped portion 414*b* may overlap with a part of the first cropped portion 414*a*.

Once again, when the processor reaches the end of the second row, the processor may restart on the left side and may move the crop position down slightly for the third cropped portion 414*c*. The processor may stop when the cropped portions reach the end (e.g., the bottom right) of the composite image 410.

Referring again to FIG. 1, the processor 106 may proceed through cropping a composite image 110 to generate multiple views of the location that are identifiable by the neural network 116. Once a location is registered through generating IDs 126 and saving extracted feature embeddings 128 for the cropped portions 114, the electronic device 102 may perform an operation based on the detected location. For example, if the electronic device 102 is placed in a location, the camera 104 may capture an image of the location. The processor 106 may provide the image to the neural network 116 to identify the location based on the ID list 122. The electronic device 102 may perform an operation (e.g., adjust security settings and/or performance settings, etc.) based on whether the neural network 116 identifies the image with a saved ID 126.

These examples may overcome the limited view of the camera 104. However, the complexity of neural network 116 may be maintained. Therefore, these examples may be deployed in scenarios such as edge computing where power resources are limited. These examples may also result in an optimized number of images (e.g., the cropped portions 114) used for identifying a location. Furthermore, these examples may be configurable. For instance, the size of the crop position movement, and/or the crop starting position may be adjusted for different scenarios.

Figure 5:
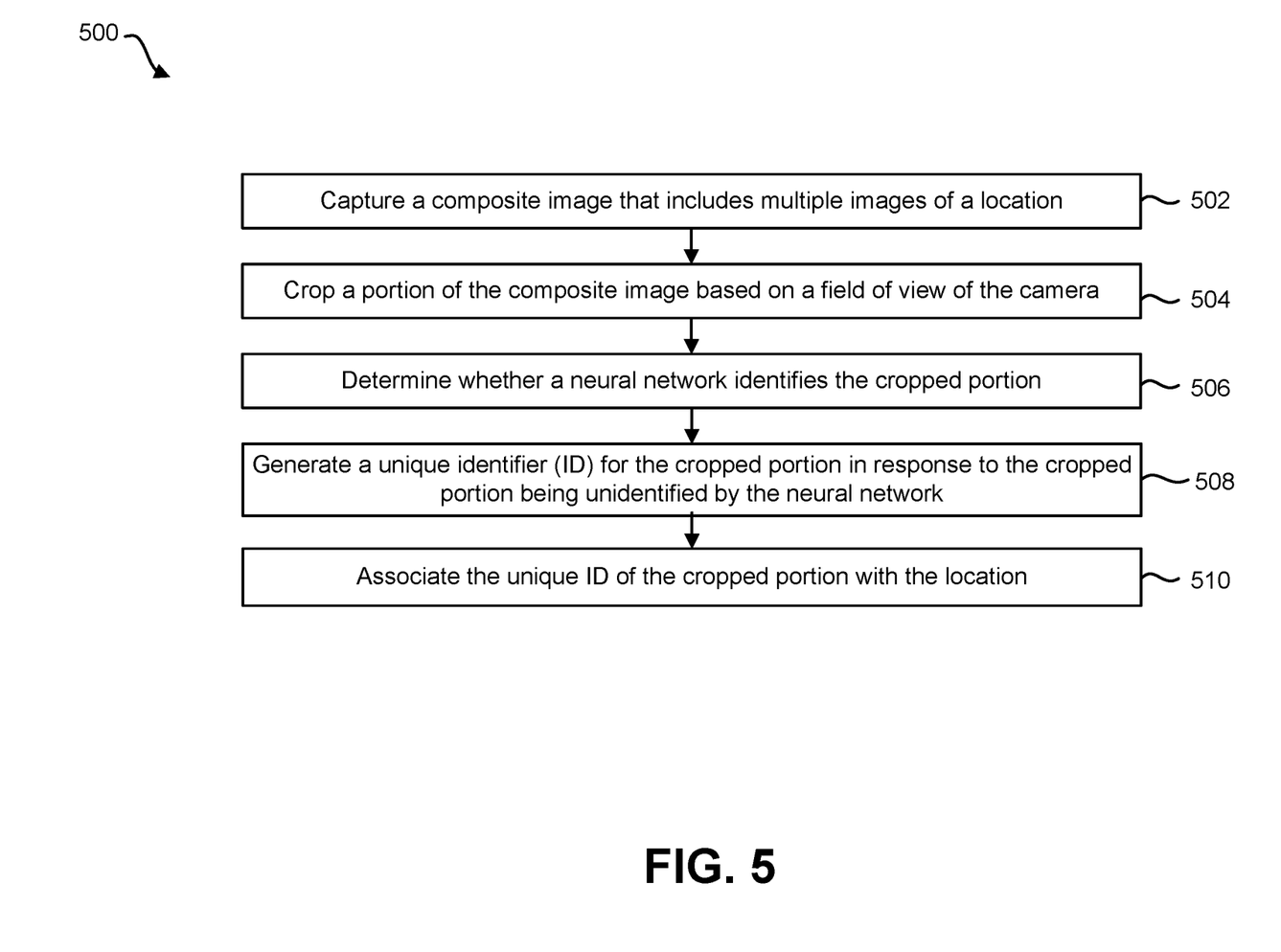
FIG. 5 is a flow diagram illustrating an example of a method for location identification from multiple images.

FIG. 5 is a flow diagram illustrating an example of a method 500 for location identification from multiple images. The method 500 and/or an element or elements of the method 500 may be performed by a computing device. For example, an element or elements of the method 500 may be performed by the electronic device 102 described in FIG. 1 and/or the processor 106 described in FIG. 1 any of which may be referred to generally as an "electronic device" in FIG. 5.

At 502, the electronic device may capture a composite image that includes multiple images of a location. For example, the electronic device may include a camera to capture images. In some examples, the composite image may be a panorama image of the location. In some examples, the camera may capture the composite image in a single scanning operation, where the scanning operation includes moving the camera to view different parts of the location.

At 504, the electronic device may crop a portion of the composite image based on a field-of-view of the camera. For example, the cropped portion may be determined based on an amount of the composite image viewable by the camera in a fixed position. In some examples, the electronic device may crop the portion of the composite image equivalent to an image size viewable by an image sensor of the camera.

At 506, the electronic device may determine whether a neural network identifies the cropped portion. For example, the electronic device may provide the cropped portion to the neural network. The neural network may convert the cropped portion of the composite image to feature embeddings. The neural network may attempt to identify the cropped portion based on the feature embeddings extracted from the cropped portion. In some examples, the neural network may measure the distance from the feature embeddings of the cropped portion as compared to extracted feature embeddings saved in an ID list of registered (e.g., known) locations.

At 508, the electronic device may generate a unique identifier (ID) for the cropped portion in response to the cropped portion being unidentified by the neural network. For example, if the neural network fails to identify the cropped portion with an ID in the ID list, then the electronic device may generate a unique ID for the cropped portion. The unique ID may distinguish the cropped portion from other images.

At 510, the electronic device may associate the unique ID of the cropped portion with the location. For example, the electronic device may save the generated unique ID in the ID list. The ID may be mapped to a given location. In some examples, the electronic device may also save the feature embeddings extracted from the cropped portion in the ID list. The extracted feature embeddings may be tagged with the unique ID such that the extracted feature embeddings are mapped to the location.

Figure 6:
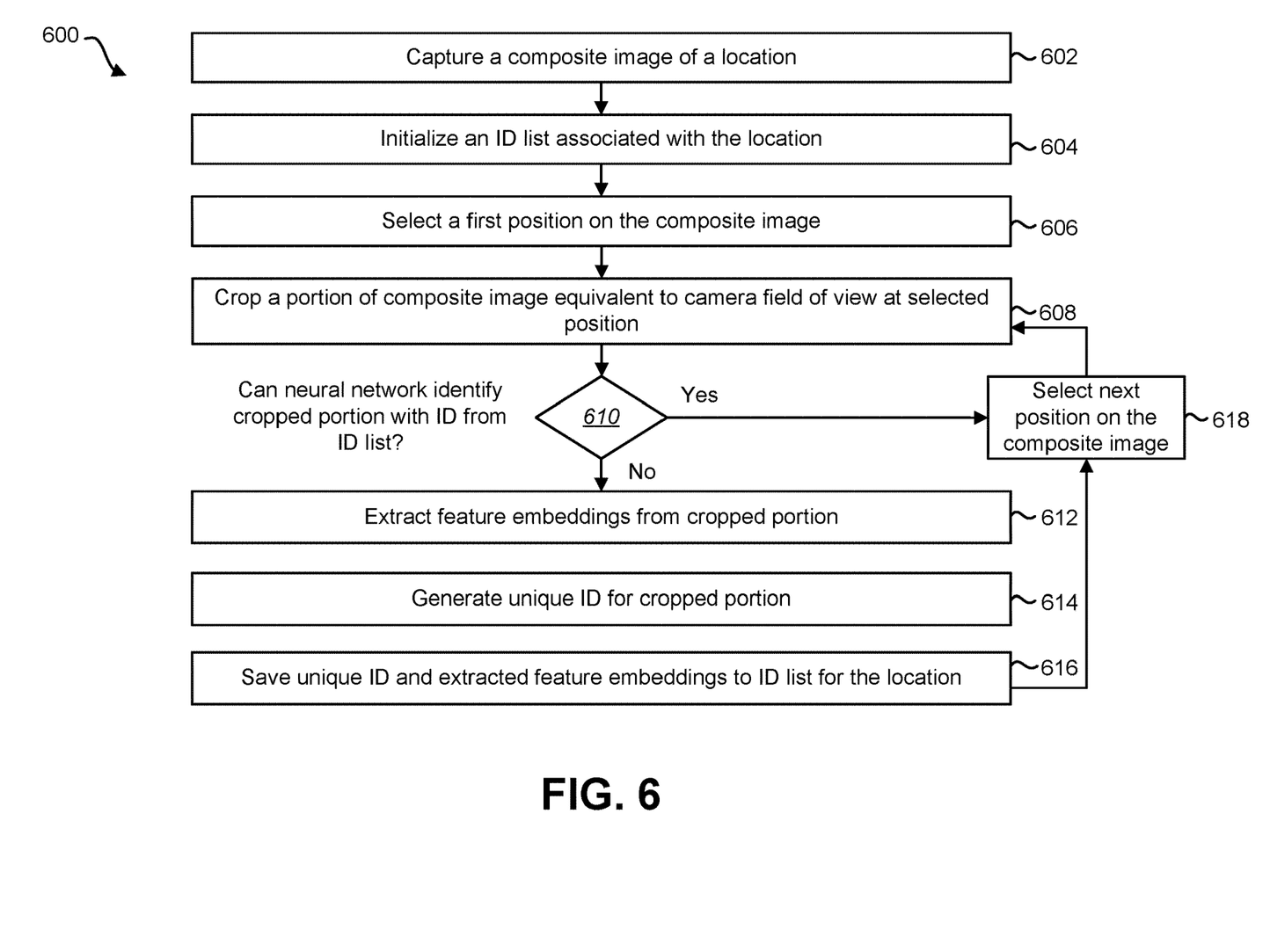
FIG. 6 is a flow diagram illustrating another example of a method for location identification from multiple images.

FIG. 6 is a flow diagram illustrating another example of a method 600 for location identification from multiple images. The method 600 and/or an element or elements of the method 600 may be performed by a computing device. For example, an element or elements of the method 600 may be performed by the electronic device 102 described in FIG. 1 and/or the processor 106 described in FIG. 1, any of which may be referred to generally as an "electronic device" in FIG. 6.

At 602, the electronic device may capture a composite image of a location. In some examples, this may be accomplished as described in FIG. 5. In some examples, the composite image may be captured during a location registration process. For example, a user may start the location registration process to teach a neural network to identify a current location of the electronic device.

At 604, the electronic device may initialize an ID list associated with the location. For example, at the beginning of the location registration process, the electronic device may store an identifier for the current location. For instance, a user may enter a name for the current location that is to be registered. In an example, the registered location may be labeled as "office," "home," or other name used to describe the location. In some examples, the electronic device may create an ID list for the registered location identifier.

At 606, the electronic device may select a first position on the composite image. For example, the electronic device may select the upper left corner of the composite image.

At 608, the electronic device may crop a portion of the composite image equivalent to the camera field-of-view at the selected position. For example, the electronic device may crop a first portion of the composite image at a first position (e.g., the upper left corner) of the composite image.

At 610, the electronic device may determine whether the neural network identifies the cropped portion with an ID from the ID list. For example, the neural network may convert the first cropped portion to a list of feature embeddings. The neural network may then compare the feature embeddings of the first cropped portion with extracted feature embeddings saved in the ID list. In the case of the first cropped portion, the ID list may not include other feature embeddings. Therefore, the neural network may fail to identify the first cropped portion.

At 612, the electronic device may extract feature embeddings from the cropped portion. For example, the electronic device may save feature embeddings from the first cropped portion in response to the first cropped portion being unidentified by the neural network. In some examples, the electronic device may save the extracted feature embeddings for the first cropped portion in the ID list.

At 614, the electronic device may generate a unique ID for the cropped portion. For example, the electronic device may generate a first ID for the first cropped portion in response to the first cropped portion being unidentified by the neural network. The unique ID may distinguish the image of the first cropped portion from other portions of the composite image.

At 616, the electronic device may save the unique ID and extracted feature embeddings in the ID list for the location. For example, the electronic device may associate (e.g., map) the first ID of the first cropped portion with the location. The electronic device may also map the extracted feature embeddings of the first cropped portion to the first ID in the ID list.

At 618, the electronic device may select the next position on the composite image. For example, the electronic device may move the crop position from the first position to a second position. In some examples, the second position may be to the left of the first position.

At 608, the electronic device may crop a second portion of the composite image at a second position of the composite image. The electronic device may then determine, at 610, whether the neural network identifies the second cropped portion with an ID from the ID list.

In one case, the neural network may identify the second cropped portion with the first ID. For example, the neural network may identify the second cropped portion based on the extracted feature embeddings from the first cropped portion. In some examples, the neural network may determine that the difference between the feature embeddings of the second cropped portion may be within a threshold of the extracted feature embeddings from the first cropped portion. The electronic device may then select, at 618, a third position on the composite image. The electronic device may then crop, at 608, a third portion of the composite image at the third position of the composite image to determine, at 610, whether the neural network identifies the third cropped portion.

However, in another case, the neural network may fail, at 610, to identify the second cropped portion with an ID from the ID list. In this case, the electronic device may save, at 612, feature embeddings from the second cropped portion in response to the second cropped portion being unidentified by the neural network. The electronic device may generate, at 614, a second ID for the second cropped portion in response to the second cropped portion being unidentified by the neural network. The electronic device may then associate, at 616, the second ID of the second cropped portion with the location.

The electronic device may continue cropping the composite image by moving from left to right in the composite image. Once the electronic device reaches the end of a row in the composite image, the electronic device may restart from the left side of the composite image with the crop position moved down. The electronic device may stop when the crop position reaches the bottom right of the composite image.

Figure 7:
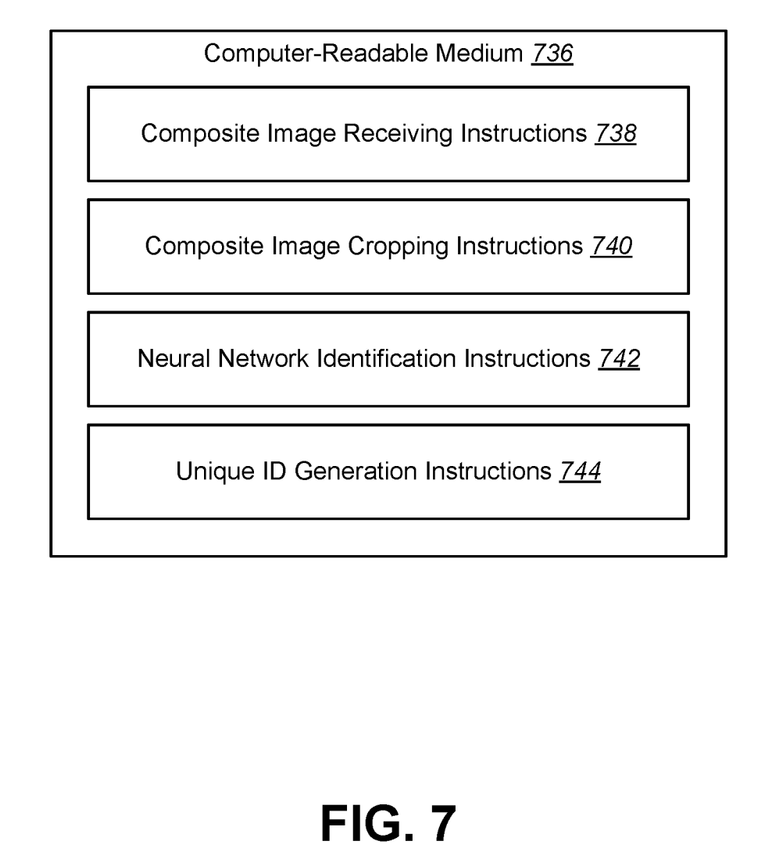
FIG. 7 is a block diagram illustrating an example of a computer-readable medium for location identification from multiple images.

FIG. 7 is a block diagram illustrating an example of a computer-readable medium 736 for location identification from multiple images. The computer-readable medium 736 may be a non-transitory, tangible computer-readable medium 736. The computer-readable medium 736 may be, for example, RAM, EEPROM, a storage device, an optical disc, and the like. In some examples, the computer-readable medium 736 may be volatile and/or non-volatile memory, such as DRAM, EEPROM, MRAM, PCRAM, memristor, flash memory, and the like. In some examples, the computer-readable medium 736 described in FIG. 7 may be an example of memory for an electronic device described herein. In some examples, code (e.g., data and/or executable code or instructions) of the computer-readable medium 736 may be transferred and/or loaded to memory or memories of the electronic device. It should be noted that the term "non-transitory" does not encompass transitory propagating signals.

The computer-readable medium 736 may include code (e.g., data and/or executable code or instructions). For example, the computer-readable medium 736 may include composite image receiving instructions 738, composite image cropping instructions 740, and neural network identification instructions 742, and unique ID generation instructions 744.

In some examples, the composite image receiving instructions 738 may be instructions that when executed cause the processor of the electronic device to receive a composite image of a location. In some examples, this may be accomplished as described in FIG. 1.

In some examples, the composite image cropping instructions 740 may be instructions that when executed cause the processor of the electronic device to crop portions of the composite image at different positions of the composite image. For example, the processor may incrementally adjust the crop position for different portions of the composite image. The processor may obtain cropped portions and the adjusted crop positions. In some examples, the processor may start at the upper left corner of the composite image. The processor may move from left to right along a row of the composite image, cropping portions at regular intervals until the processor reaches the end of the row. The processor may then return to the left side of the composite image while shifting the crop position down. The processor may continue cropping portions until the processor reaches the end (e.g., the bottom right) of the composite image. In some examples, this may be accomplished as described in FIG. 1.

In some examples, the neural network identification instructions 742 may be instructions that when executed cause the processor of the electronic device to determine whether a neural network identifies the cropped portions with unique identifiers (IDs) associated with the location based on feature embeddings extracted from the cropped portions. For example, the neural network may convert a cropped portion of the composite image to feature embeddings. The neural network may determine whether feature embeddings for a given cropped portion match extracted feature embeddings saved with an ID in an ID list. In some examples, this may be accomplished as described in FIG. 1.

In some examples, the unique ID generation instructions 744 may be instructions that when executed cause the processor of the electronic device to generate unique IDs for cropped portions unidentified by the neural network. The generated unique IDs may be associated with the location.

For example, the processor may generate a unique ID for cropped portions that the neural network fails to identify with an ID in the ID list. The unique ID may differentiate the cropped portion from other images in the ID list. In some examples, the processor may save the generated unique IDs to the ID list. In some examples, the processor may also extract feature embeddings from the cropped portions unidentified by the neural network. The processor may then save the extracted feature embeddings with the unique IDs in the ID list. In some examples, this may be accomplished as described in FIG. 1.

FIG. 8 illustrates an example of an ID list 822 for location identification with a composite image. An electronic device may store the ID list 822. In this example, a processor may provide a cropped portion of a composite image to a neural network, as described in FIG. 1. The neural network and/or the processor may generate an ID 826 for cropped portions that the neural network fails to identify. In this example, the ID list 822 includes five IDs 826. In some examples, the ID 826 may be an index in the ID list 822 referring to a registered location 824.

In this example, an ID 826 may have an associated feature embedding 828. In some examples, the neural network may extract a feature embedding 828 from a cropped portion of a composite image. If the neural network fails to identify the extracted feature embedding, then the processor may generate a unique ID 826 for the cropped image. The processor may then save the ID 826 and the feature embedding 828 in the ID list 822. The ID 826 and feature embedding 828 may be mapped to the registered location 824. In some examples, the feature embedding 828 may be a vector that includes values extracted by the neural network to represent features in an image (e.g., the cropped portions of the composite image).

In an example, a user may initiate a scan of a location during the location identification process described herein. A user-supplied name of the location may be saved in the ID list 822 as the registered location 824. In this example, the ID list 822 includes two registered locations 824: "office" and "bedroom." In this example, the ID list 822 includes three entries for "office" and two entries for "bedroom."

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operations, functions, aspects, or elements of the examples described herein may be omitted or combined.

The invention claimed is:

1. An electronic device, comprising:
a camera to capture a composite image comprising multiple images of a location; and
a processor to:
crop a portion of the composite image based on a field-of-view of the camera;
determine whether a neural network identifies the cropped portion;
generate a unique identifier (ID) for the cropped portion in response to the cropped portion being unidentified by the neural network; and
associate the unique ID of the cropped portion with the location.

2. The electronic device of claim 1, wherein the composite image comprises a panorama image of the location.

3. The electronic device of claim 1, wherein the camera is to capture the composite image in a single scanning operation.

4. The electronic device of claim 3, wherein the scanning operation comprises moving the camera to view different parts of the location.

5. The electronic device of claim 1, wherein the cropped portion is determined based on an amount of the composite image viewable by the camera in a fixed position.

6. The electronic device of claim 1, wherein the processor is to crop the portion of the composite image equivalent to an image size viewable by an image sensor of the camera.

7. The electronic device of claim 1, wherein the processor is to save extracted feature embeddings from the cropped portion in response to the cropped portion being unidentified by the neural network.

8. An electronic device, comprising:
a camera to capture a composite image comprising multiple images of a location; and
a processor to:
crop a first portion of the composite image at a first position of the composite image;
determine that a neural network fails to identify the first cropped portion;
save feature embeddings from the first cropped portion in response to the first cropped portion being unidentified by the neural network;
generate a first identifier (ID) for the first cropped portion in response to the first cropped portion being unidentified by the neural network; and
associate the first ID of the first cropped portion with the location.

9. The electronic device of claim 8, wherein the processor is to:
crop a second portion of the composite image at a second position of the composite image.

10. The electronic device of claim 9, wherein the processor is to:
determine that the neural network identifies the second cropped portion with the first ID; and
crop a third portion of the composite image at a third position of the composite image, the processor to determine whether the neural network identifies the third cropped portion.

11. The electronic device of claim 10, wherein the neural network identifies the second cropped portion based on an extracted feature embeddings from the first cropped portion.

12. The electronic device of claim 9, wherein the processor is to:
determine that the neural network fails to identify the second cropped portion;
save feature embeddings from the second cropped portion in response to the second cropped portion being unidentified by the neural network;
generate a second ID for the second cropped portion in response to the second cropped portion being unidentified by the neural network; and
associate the second ID of the second cropped portion with the location.

13. A non-transitory tangible computer-readable medium comprising instructions when executed cause a processor of an electronic device to:
receive a composite image of a location;
crop portions of the composite image at different positions of the composite image;

determine whether a neural network identifies the cropped portions with unique identifiers (IDs) associated with the location based on feature embeddings extracted from the cropped portions; and generate unique IDs for cropped portions unidentified by the neural network, the generated unique IDs being associated with the location.

14. The non-transitory tangible computer-readable medium of claim 13, wherein the instructions when executed cause the processor to:

save the generated unique IDs to an ID list.

15. The non-transitory tangible computer-readable medium of claim 14, wherein the instructions when executed cause the processor to:

extract feature embeddings from the cropped portions unidentified by the neural network; and save the extracted feature embeddings with the unique IDs in the ID list.

\* \* \* \* \*